United States Patent
Müller et al.

(10) Patent No.: US 6,942,844 B2
(45) Date of Patent: Sep. 13, 2005

(54) METHOD AND FACILITY FOR PRODUCING SILANE

(75) Inventors: Dirk Müller, Bergisch Gladbach (DE); Georg Ronge, Düsseldorf (DE); Johannes-Peter Schäfer, Kürten (DE); Hans-Joachim Leimkühler, Leverkusen (DE); Ulrike Strauss, Duisburg (DE); Hans-Dieter Block, Leverkusen (DE)

(73) Assignee: Solarworld Aktiengesellschaft, Bonn (DE)

( * ) Notice: Subject to any disclaimer, the term of this patent is extended or adjusted under 35 U.S.C. 154(b) by 297 days.

(21) Appl. No.: 10/240,995

(22) PCT Filed: Mar. 26, 2001

(86) PCT No.: PCT/EP01/03393

§ 371 (c)(1),
(2), (4) Date: Apr. 16, 2003

(87) PCT Pub. No.: WO01/77017

PCT Pub. Date: Oct. 18, 2001

(65) Prior Publication Data

US 2004/0091412 A1 May 13, 2004

(30) Foreign Application Priority Data

Apr. 7, 2000 (DE) .......................................... 100 17 168

(51) Int. Cl.$^7$ ................................................ C01B 33/04

(52) U.S. Cl. ........................................ 423/347; 422/255

(58) Field of Search ................................. 423/347, 344, 423/336; 422/255, 256

(56) References Cited

U.S. PATENT DOCUMENTS

| | | | |
|---|---|---|---|
| 4,340,574 A | 7/1982 | Coleman | |
| 4,701,430 A | 10/1987 | Jung et al. | |
| 5,026,533 A | 6/1991 | Matthes et al. | |

FOREIGN PATENT DOCUMENTS

| | | |
|---|---|---|
| DE | 21 62 537 | 7/1972 |
| DE | 25 07 864 | 8/1975 |
| DE | 33 11 650 | 10/1983 |
| DE | 35 00 318 | 8/1985 |
| EP | 0 063 067 | 10/1982 |
| EP | 0 093 640 | 11/1983 |
| FR | 2 118 725 | 7/1972 |
| FR | 2 261 977 | 9/1975 |
| JP | 61191513 | 8/1986 |
| JP | 1317114 | 12/1989 |

*Primary Examiner*—Stanley S. Silverman
*Assistant Examiner*—Edward M. Johnson
(74) *Attorney, Agent, or Firm*—McGlew and Tuttle, P.C.

(57) ABSTRACT

Silane is produced in a continuous process by disproportionating trichlorsilane in at least 2 recreation areas for reaction/distillation, which are run through by a countercurrent of steam and liquid in the presence of catalytically active solid under a pressure which ranges between 500 mbar and 50 bar.

19 Claims, 5 Drawing Sheets

METHOD AND FACILITY FOR PRODUCING SILANE

FIELD OF THE INVENTION

The present invention refers to a continuous process for producing silane $SiH_4$ by catalytically disproportionating trichlorosilane $SiHCl_3$ to $SiH_4$ and silicon tetrachloride $SiCl_4$. The invention also refers to a facility for carrying out the aforesaid process.

BACKGROUND OF THE INVENTION $SiH_4$ is an excellently suitable starting material which, following further purification if necessary, can be pyrolysed in order to separate very pure, semiconductor-quality silicon. The demand for high-purity silicon is growing strongly and so does the demand for pure silane whose excellent suitability for the production of high-purity silicon is increasingly recognized and utilized.

Among the processes for producing silane described in the literature, the production from trichlorosilane by means of disproportionation is advantageous from an economic point of view. It is known that amines, in particular tertiary amines and their hydrochlorides and quaternary ammonium chlorides, both in liquid form (DE 3 500 318 A1) and in solid form, e.g. bound to solid carriers, can be used as catalysts in order that the disproportionation of trichlorosilane be accelerated in an economically advantageous manner. Amines bound to solid carriers (U.S. Pat. Nos. 4,701,430, 5,026,533, DE 3 500 318 A1, DE 3 311 650 C2, DE-OS-2 507 864) are preferably used since in this way impure amines can be prevented from being dragged into the reacting gaseous/liquid silane/chlorosilane phase.

Liquid catalysts, as selected in some of the processes described, are disadvantageous in that they are gradually dragged out of the reactor since they can in no case be separated completely from the reaction products. The amounts of catalyst dragged along cause problems in subsequent process steps, or also in upstream process steps in case of a circulation system, since they can collect at certain places of the system and e.g. catalyse undesired reactions there. In addition, a liquid catalyst cannot be successfully distributed in the column as evenly as possible, but it will concentrate locally due to its specific steam pressure. This problem is not at all solved, but at the most reduced, by using two catalysts having different boiling points as suggested in DE 3 500 318 A1.

As a rule, the disproportionation of trichlorosilane is carried out in several steps, for example in two steps. Attempts have been made for individual steps of disproportionation to take place according to the principles of reactive distillation. Reactive distillation is characterized by combining reaction and separation by means of distillation in one apparatus, particularly in a column. By continually removing the lowest-boiling component in each element of space by means of distillation, an optimum gradient between the state of equilibrium and the actual content of lower-boiling components or the lowest-boiling component, respectively, is maintained at any time so that a maximum reaction velocity results. For example, JP 01 317 114 indicates a reactive distillation process for the step of disproportionating dichlorosilane to silane and a trichlorosilane/silicon tetrachloride mixture. DE OS-2 162 537 also indicates a reactive distillation process for the aforesaid disproportionation step. In addition, DE OS-2 162 537 also shows a reactive distillation process for the step of disproportionating trichlorosilane to dichlorosilane and silicon tetrachloride.

DE OS-2 507 864 discloses a process for producing silane which is characterized in that trichlorosilane is introduced into a bed of an anion exchange resin which is not soluble in the reaction medium and contains tertiary amino groups or quaternary ammonium groups on a carbon atom and the temperature of the resin bed is maintained such that trichlorosilane is disproportionated into products which ascend in the bed, on the one hand, and silicon tetrachloride which condenses and flows to the bottom of the column, on the other, and in that the temperature at the upper part of the bed is maintained above the boiling point of silane and below the boiling point of monochlorosilane and silane which is virtually free from chlorosilanes is obtained from the bed.

The aforesaid process distinguishes itself from the other known processes in that (1) it is a single-stage process as regards equipment, i.e. the desired enriched products silane and silicon tetrachloride can be removed at different places of one and the same apparatus so that relatively few equipment and a reduced amount of energy are required, in that (2) it permits the products silane (in concentrations between 96 and 98% $SiH_4$) and silicon tetrachloride (in concentrations e.g. between 70 and 80% $SiCl_4$) to be produced in relatively high concentrations with no further auxiliary aggregates being needed, in that (3) only minimum amounts of impurities are dragged from the catalyst into the reaction mixture thanks to the solid insoluble catalyst (hereinafter referred to as catalytically active solid matter) and a considerably lower separation effort for separating off the catalysts is required, compared to liquid soluble catalysts, and the collection of volatile, liquid catalysts in certain sections of the column is strictly avoided, and in that (4) the amount of energy required for separating the silanes or chlorosilanes forming during the individual stages of equilibrium of the disproportionation process is reduced due to the principle of reactive rectification.

However, a serious disadvantage of the aforesaid process described in DE OS-2 507 864 consists in that the amount of energy used for separating the silanes or chlorosilanes has to be carried away completely at a very low temperature level corresponding to the condensation temperatures. According to DE OS-2 507 864, the temperature at the top of the column has to be set below the condensation temperature of monochlorosilane $SiH_3Cl$, while the temperature in the trichlorosilane $SiHCl_3$ inlet area has to be set such that it enables trichlorosilane to be evaporated. Thus the energy required for evaporating the various chlorosilanes and silane in the individual sections of the column is finally carried away at a temperature below the condensation temperature of monochlorosilane, i.e. below $-50°$ C. down to $-120°$ C., depending on pressure. As is generally known, carrying away heat at low temperature levels is costly and causes additional energy consumption, with costs and energy required increasing the lower the temperature of the cooling medium has to be set.

SUMMARY OF THE INVENTION

The object of the invention is to indicate a continuous process as well as a facility for producing silane by catalytically disproportionating trichlorosilane to silane and silicon tetrachloride, in which process disproportionation takes place by means of reaction/distillation on catalytically active solid matter and silane and silicon tetrachloride are obtained in relatively high concentrations while the effort required for separating the disproportionated products and condensing them is reduced to a minimum. Heat is to be substantially carried away at a temperature level at which coolants having a temperature that can be achieved without great effort can be used in order to reduce the equipment and energy effort required to produce cold which is needed to carry away heat in order to condense the products.

According to the invention, a continuous process for producing $SiH_4$ by catalytically disproportionating trichlorosilane $SiHCl_3$ to silane $SiH_4$ and silicon tetrachloride $SiCl_4$ has been developed, which process is characterized in that disproportionation is carried out in at least 2 reaction areas for reaction/distillation containing catalytically active solid matter under a pressure which ranges between 500 mbar and 50 bar, wherein the lower-boiling product mixture containing $SiH_4$ produced in a first reaction area is intercondensed at a temperature ranging between −40° C. and 50°, the product mixture which has not been condensed during the aforesaid step and which is enriched with highly volatile chlorosilanes, particularly with dichlorosilane $SiH_2Cl_2$, monochlorosilane $SiH_3Cl$ and silane $SiH_4$, is passed into at least one further reaction area for reaction/distillation and the mixture which has been condensed in the intercondenser, which is enriched with low-volatility chlorosilanes and contains high amounts of trichlorosilane $SiHCl_3$ and silicon tetrachloride $SiCl_4$ in particular, is recycled into the first reaction area.

Advantageously, the lower-boiling product mixture containing $SiH_4$ which has been produced is partially or completely condensed in the top condenser.

It is preferred that disproportionation be carried out in 2 to 10, particularly preferred in 2 to 5 and even more preferred in 2, reaction areas for reaction/distillation.

Suitable catalytically active solid matter is known and, for example, described in DE-OS-2 507 864. Suitable solid matter includes, for example, solid substances in which amino groups or alkylene amino groups are carried on a frame of polystyrol cross-linked by divinylbenzol. Amino groups of alkylene amino groups include, for example: dimethylamino, diethylamino, ethylmethylamino, di-n-propylamino, di-iso-propylamino, di-2-chloroethylamino, di-2-chloropropylamino groups and their hydrochlorides or the trialkylammonium groups which are produced therefrom by means of methylation, ethylation, propylation, butylation, hydroxyethylation or benzylation and contain chloride as counterion. Of course, catalytically active solid matter containing other anions, e.g. hydroxide, sulphate, hydrogen sulphate, bicarbonate and others, can be introduced into the process according to the invention in the case of quaternary ammonium salts or protonated ammonium salts. However, conversion into the chloride form will inevitably occur as time passes due to the reaction conditions, even in the case of organic hydroxy groups. Therefore ammonium salts containing chloride as counterion are preferred.

Suitable catalytically active solid matter also includes, for example, solid substances consisting of a frame of polyacrylic acid, especially a frame of polyacrylamide, which has bound trialkylbenzylammonium, e.g. via an alkyl group.

Another group of catalytically active solid matter suitable for the process according to the invention includes, for example, solid substances in which sulphonate groups are bound to a frame of polystyrol cross-linked by divinylbenzol, the cationic companions of the sulphonate groups being tertiary or quaternary ammonium groups.

As a rule, macroporous or mesoporous exchange resins are more suitable than gel resins. Further suitable catalytically active solid matter includes, for example, solid substances carrying organic amino groups of the aforesaid type, e.g. such ones containing a 3-siloxypropyldimethylamino group, bound to a rigid inorganic frame such as silicic acid or zeolite (U.S. Pat. No. 4,701,430). The suitable catalytically active solid matter is normally used in the form of pearls.

A number of suitable catalytically active solid substances are commercially available.

Several methods for activating and pretreating the aforesaid catalysts are known to those skilled in the art.

In a preferred embodiment of the process according to the invention, the product mixture containing $SiH_4$ is separated from higher-boiling chlorosilanes contained in the mixture before condensation of the $SiH_4$ end product takes place in order to increase the concentration of $SiH_4$. The aforesaid separation takes place at the same pressure or, preferably, at an increased pressure, compared to intercondensation, so that the $SiH_4$ concentration can be achieved at a higher temperature level and thus a smaller amount of product has to be condensed while $SiH_4$ concentration is higher. Chlorosilane obtained during the separation process is suitably recycled into one of the reaction areas for reaction/distillation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
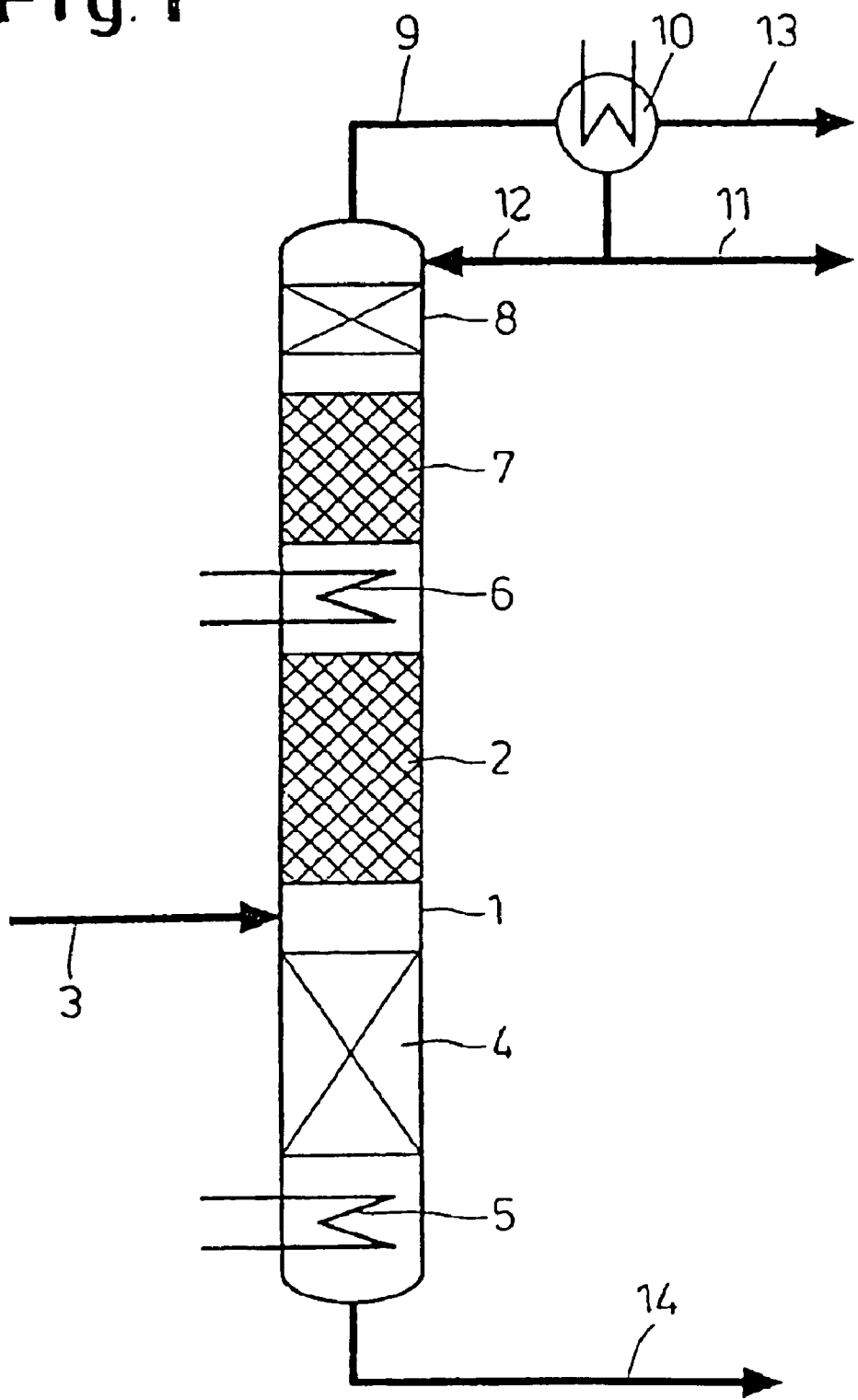
FIG. 1 shows a facility for producing silane which comprises two reaction areas for reaction/distillation, an intercondenser and an integrated rectifying section and an external top condenser for condensing silane arranged downstream of the rectifying section.

Referring to the drawings in particular, FIG. 1 shows a process diagram of a facility for continuously producing silane $SiH_4$ which comprises a reaction column 1 including reaction areas for reaction/distillation 2 and 7 for catalytically disproportionating trichlorosilane $SiHCl_3$. Disproportionation in the reaction areas 2 and 7 takes place in catalyst beds each of which consists of a layer of bulk material which is made up of solid bodies formed of catalytically active solid matter and through which the disproportionation products can flow. Instead of a layer of bulk material, the reaction area can also be provided with packed catalyst bodies.

$SiHCl_3$ is supplied into the reaction column 1 via an inlet 3 which opens into the column at a suitable place. For example, the inlet can open into the stripping section 4, into the area between the reaction area for reaction/distillation 2 and the stripping section 4, into the reaction area for reaction/distillation 2, into the intercondenser 6 and/or into the reaction area for reaction/distillation 7. In the reaction areas 2 and 7, $SiHCl_3$ is disproportionated to produce a vaporous product mixture which contains $SiH_4$ and ascends in the reaction area and a liquid mixture which contains $SiCl_4$ and flows out of the reaction area.

The liquid which contains $SiCl_4$ and flows out of the reaction area is introduced into a stripping section 4 which works by means of distillation and is arranged below the reaction areas for reaction/distillation 2 and 7 in the reaction column 1 and below which stripping section 4 a bottom evaporator 5 is arranged out of which the bottom product silicon tetrachloride $SiCl_4$ flows off via an outlet 14. The heat required for disproportionating $SiHCl_3$ is supplied into the reaction column via the heat exchanger 5.

An intercondenser 6 for the product mixture containing $SiH_4$ and ascending in the reaction area 2 is provided above the reaction areas 2 and 7, in which intercondenser the concentrations of $SiH_4$, $SiH_3Cl$ and $SiH_2Cl_2$ in the product mixture are increased by partially condensing higher-boiling components at a temperature between $-40°$ C. and $50°$ C., preferably between $-5°$ C. and $40°$ C. The heat of condensation is carried away by a cooling medium flowing through the intercondenser 6 are supplied into a second reaction area for reaction/distillation 7 which is arranged downstream of the intercondenser, in the direction of flow of the ascending product components, and subsequently to a rectifying section 8 in order to further increase their concentration. In the exemplary embodiment according to FIG. 1 the rectifying section 8 is inserted above the reaction area for reaction/distillation 7 and integrated into the reaction column 1. The rectifying section can, however, also be arranged outside the reaction column. The product mixture exiting from the rectifying section 8 is finally supplied from the top of the reaction column into a top condenser 10 via an exhaust 9, condensed there and the $SiH_4$ end product obtained carried away in liquid state via an $SiH_4$ product pipe 11. Part of the $SiH_4$ obtained is recycled to the top of the reaction column 1 via a branch pipe 12. The branch pipe 12 opens into the column above the rectifying section 8.

The inert gaseous components produced as a rest during the condensation of $SiH_4$ in the top condenser 10 are removed from the top condenser via an inert gas pipe 13.

According to the invention, in the embodiment according to FIG. 1, silane in a concentration of >70%, preferably >90%, particularly preferred >98%, is obtained once the product removed at the top of the reaction column 1 has been condensed in the top condenser 10. After disproportionating $SiHCl_3$ in the reaction area for reaction/distillation 2 according to the invention the lower-boiling product containing $SiH_4$ which passes from the reaction area towards the top of the reaction column 1 is intercondensed. The intercondenser 6 operates at temperatures at which the heat of condensation can be carried away by a cooling medium at between $-40°$ C. and $50°$ C., preferably between $-5°$ C. and $40°$ C., so that only a considerably smaller part of the product mixture containing $SiH_4$, $SiH_3Cl$ and $SiH_2Cl_2$ which has not been condensed is supplied into the second reaction area for reaction/distillation 7 according to the invention and to the rectifying section 8 which is equipped with the fittings normally used for distillation, such as plates and packings. Only the gas flow exiting from the rectifying section has finally to be condensed at very low temperatures in the top condenser 10.

The rectifying section 8 and the associated top condenser 10 can also be arranged outside the reaction column 1 externally.

Given the normally used pressures of between 500 mbar and 50 bar, preferably 1 to 10 bar, and the desired purities of the silane product, the top condenser 10 has to be operated below the condensation temperatures of <$-40°$ C., in most cases even below <$-60°$ C. The installation of separating sections which work by means of distillation only and are arranged upstream of the condensation of the silane end product and the arrangement of a stripping section 4 which works by means of distillation above the bottom evaporator 5 enable the energy put in to be used several times, namely (1) for purifying and concentrating silane in the rectifying section 8, (2) for continually removing those products or intermediate products, respectively, which are lower-boiling, under the prevailing local conditions as regards equipment, by means of distillation and thus for increasing the reaction velocity in the reaction areas for reaction/distillation 2 and 7 and (3) for purifying $SiCl_4$ in the lower part of the reaction column. The stripping section 4 which works by means of distillation and therefore enables purification of $SiCl_4$ removed at the bottom provides another advantage, compared to the process known from DE-OS-2 507 864, since a subsequent column needed to purify $SiCl_4$ is no longer necessary and the amount of energy required for this process step can thus be saved.

Figure 2:
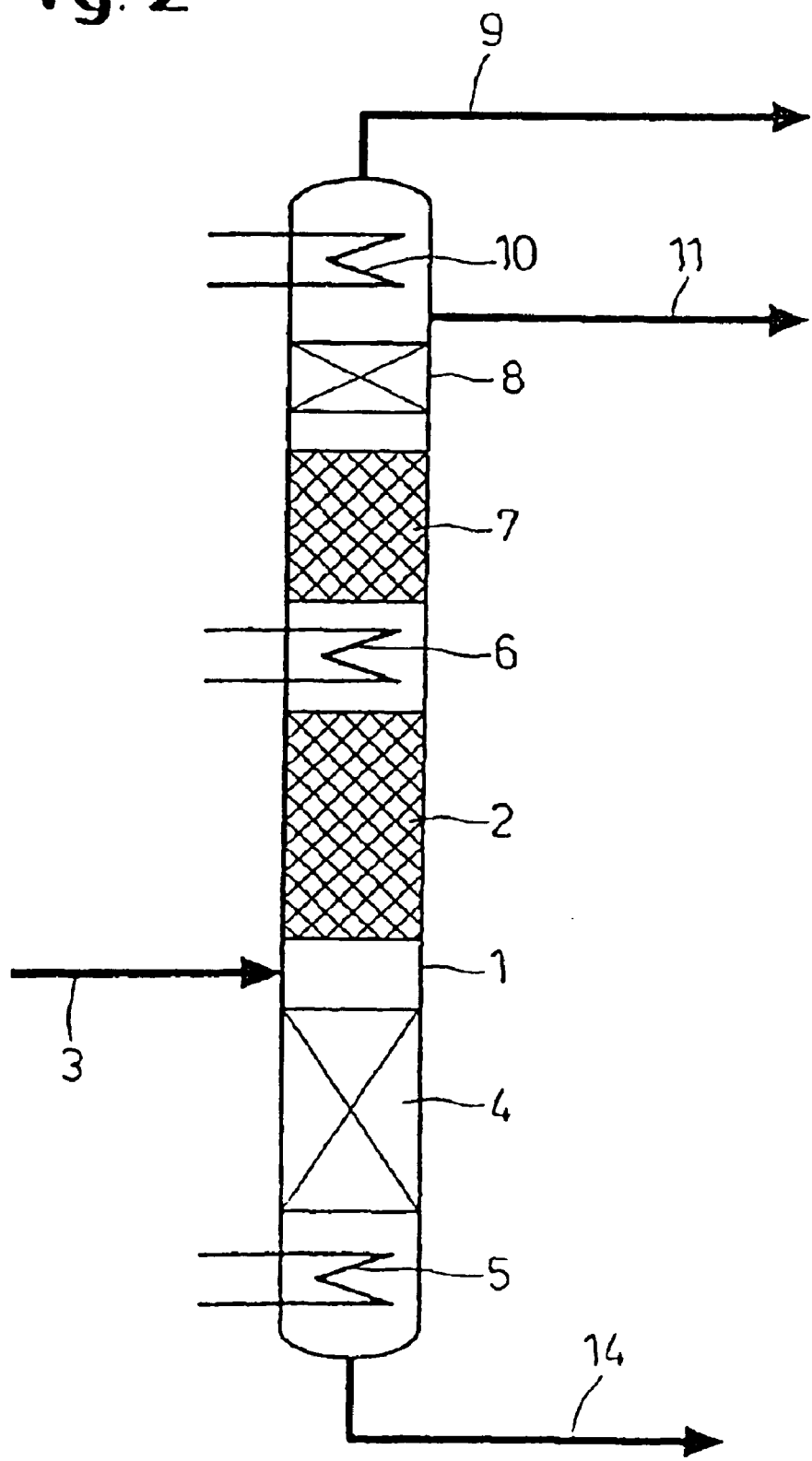
FIG. 2 shows a facility for producing silane which comprises two reaction areas for reaction/distillation, an intercondenser, an integrated rectifying section and an integrated top condenser for condensing silane.

FIG. 2 shows a second embodiment of the invention. The configuration of the reaction column 1 is substantially the same as in the embodiment according to FIG. 1. All parts of the apparatus which are designed analogous to the parts according to FIG. 1 are designated by the same reference numerals. In contrast to the embodiment described above, the top condenser 10 in the embodiment according to FIG. 2 is not arranged externally outside the column, but integrated into the reaction column 1. The integration of the top condenser 10 into the reaction column 1 enables space to be saved, on the one hand, and provides advantages with respect to industrial safety, on the other, since the holdup containing silane inside the facility is reduced.

Figure 3:
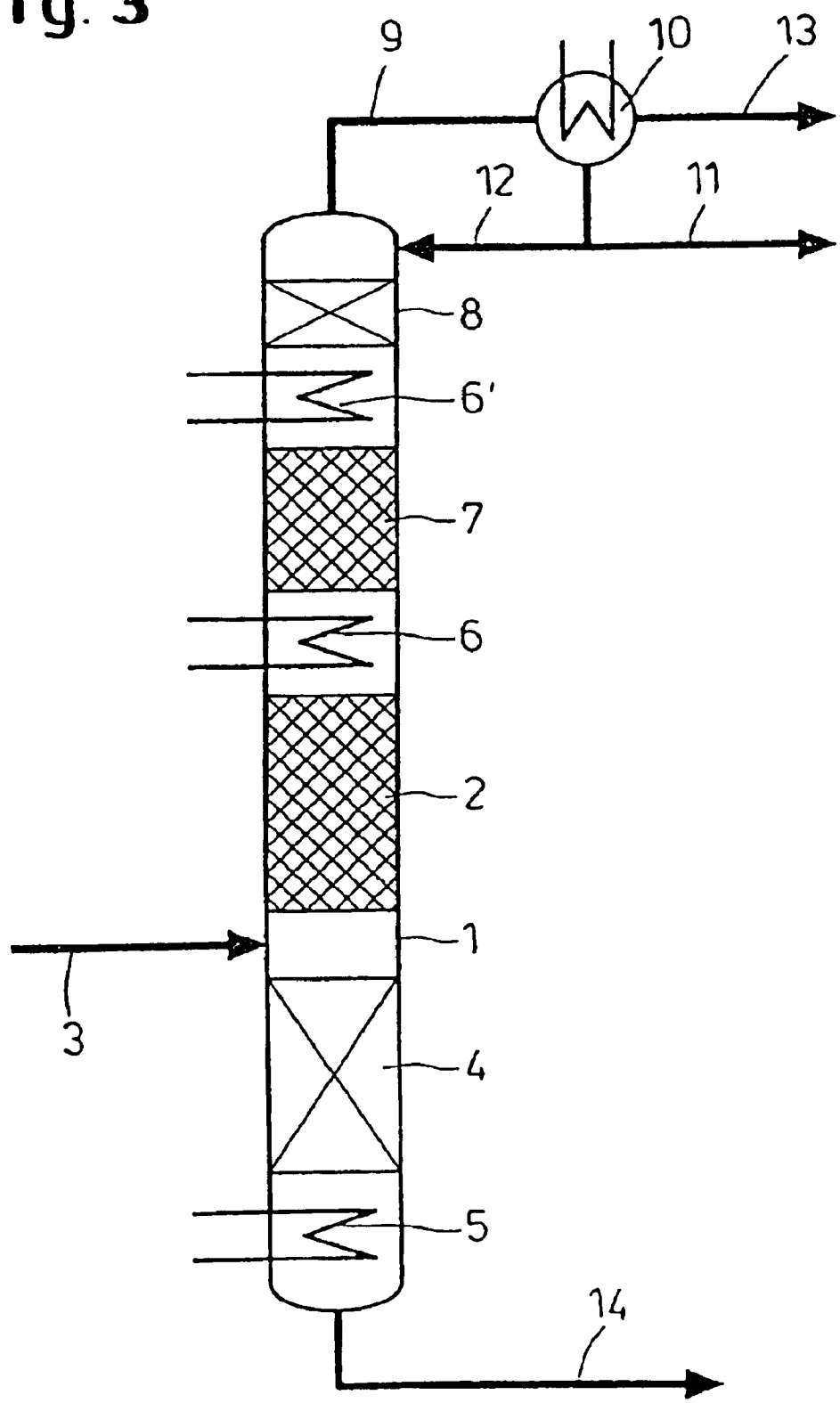
FIG. 3 shows a facility for producing silane which comprises two reaction areas for reaction/distillation, two intercondensers and an integrated rectifying section and an external top condenser for condensing silane arranged downstream of the rectifying section.

In FIG. 3, a third embodiment is shown by way of example. This embodiment also substantially corresponds to the embodiment according to FIG. 1. All parts of the apparatus which are designed analogous to the parts according to FIG. 1 are designated by the same reference numerals. In the embodiment according to FIG. 3, the reaction column 1 is equipped with two intercondensers 6 and 6' instead of a single one. The use of two or more intercondensers enables the heat of intercondensation to be carried away in an exergetically advantageous manner at different temperature levels while the driving temperature differences are small.

Advantageously, 1 to 5 intercondensers, preferably 1 to 3, particularly preferred 1 to 2, are used according to the invention.

Figure 4:
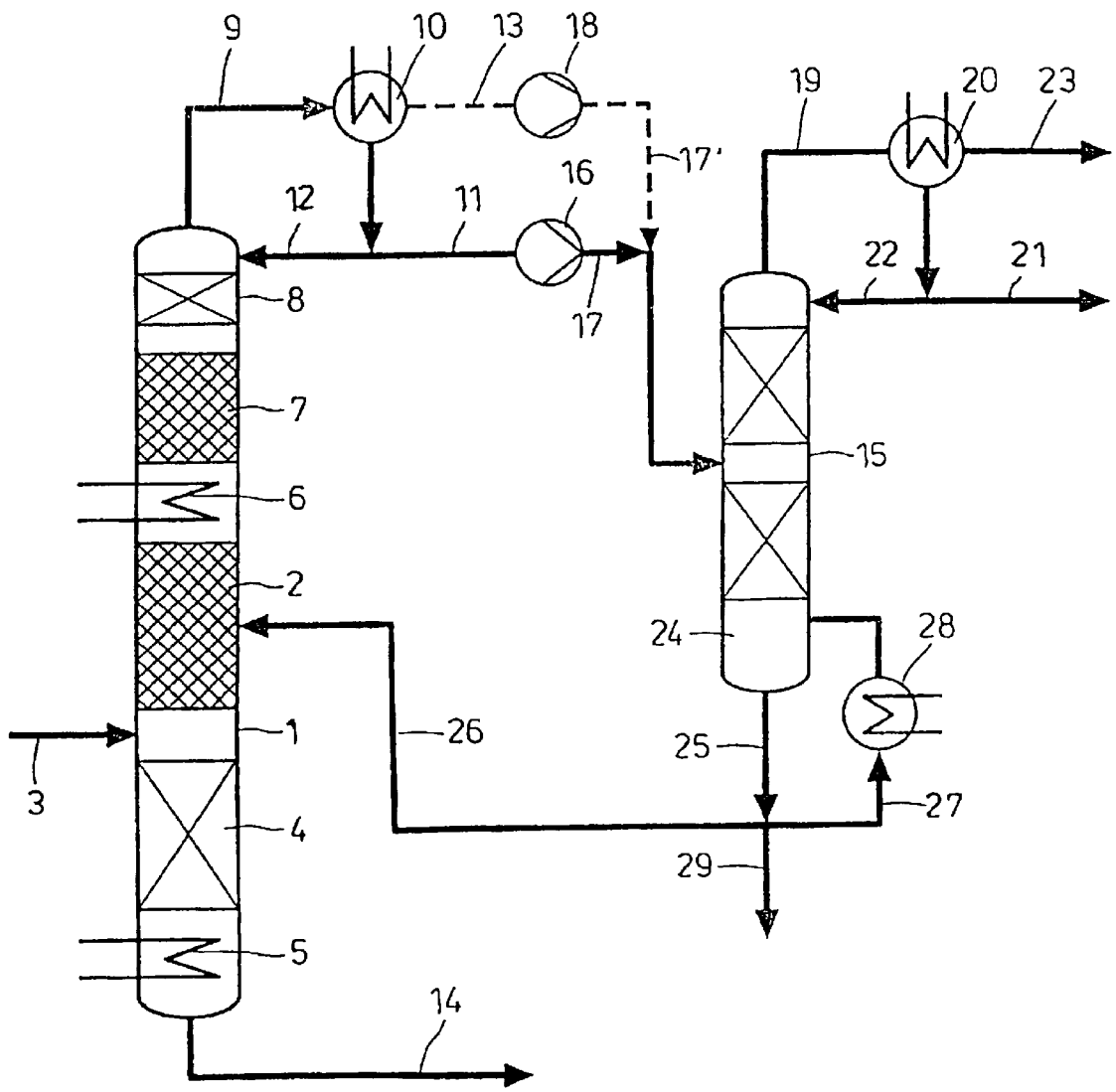
FIG. 4 shows a facility for producing silane which comprises two reaction areas for reaction/distillation, an intercondenser and an integrated rectifying section, an external condenser arranged downstream of the rectifying section, a separating column arranged downstream of the foregoing and a top condenser for condensing silane coupled to the separating column.

A fourth exemplary embodiment according to the invention is illustrated in FIG. 4. This example shows the use of a separating column 15 which is arranged downstream of the reaction column 1 of the exemplary embodiment 1 and serves to further concentrate and/or purify the product mixture containing silane. All parts of the apparatus which are designed analogous to the parts according to FIG. 1 are designated by the same reference numerals. In the exemplary embodiment according to FIG. 4, the separating column 15 is arranged downstream of the condenser 10 which is arranged between the rectifying section 8 and the separating column 15. In the condenser 10, the non-condensed product mixture containing $SiH_4$ which exits from the rectifying section 8 via the exhaust 9 is condensed at least in part before it enters the separating column 15 so that a product mixture whose $SiH_4$ concentration is increased is introduced into the separating column 15. For example, at least 30% of the non-condensed product mixture containing $SiH_4$ which exits from the rectifying section 8 via the exhaust 9 is condensed. Part of the condensate produced in the condenser 10 is recycled as a reflux liquid into the reaction column 1, above the rectifying section 8 thereof, via a branch pipe 12. The remaining part of the condensate is compressed with the aid of a liquid pump 16 and passed into the separating column 15 via a pressure pipe 17. If only part of the product mixture exiting from the rectifying section 8 is condensed in the condenser 10, the rest will be sucked off via an exhaust 13 by means of a compressor 18 and supplied in a compressed form into the separating column 15 via a pressure pipe 17'. Alternatively, the flow 13 can also be reprocessed.

At the top of the separating column 15, there is an exhaust 19 which leads to a top condenser 20 from which the produced silane which has been condensed and further concentrated and/or purified is carried away via an $SiH_4$ product pipe 21. Part of the liquid silane is recycled into the separating column 15 via a branch pipe 22. Inert gaseous components produced as a rest in the top condenser are carried away via an inert gas pipe 23.

The bottom product of the separating column is carried away from the bottom 24 of the separating column 15 via a bottom drain 25. Part of the bottom product can be recycled into the reaction column 1 via the branch pipe 26 if desired, another part is recycled into the bottom area of the separating column 15 via a return pipe 27 once it has been evaporated in the heat exchanger 28, yet another part can be completely removed from the facility (29) in order to remove impurities.

In the exemplary embodiment according to FIG. 4, a liquid or gaseous top product having lower silane purity ranging between 25% and 90% is produced by reducing the amount of reflux liquid, compared to the exemplary embodiment according to FIG. 1, and by means of complete or partial condensation in the condenser 10 in order to increase the condensation temperature in the condenser 10 and to further reduce the energy of condensation which has to be carried away at a very low temperature. In order to further purify the aforesaid top product, it is then separated in the separating column 15 which is arranged downstream and in which the same or, preferably, a higher pressure than in the reaction column 1, preferably between 15 bar and 100 bar, is set so that the separating column 15 consequently operates at higher temperatures than the reaction column 1, with respect to the same composition. In this variant, the bottom product of the separating column 15 arranged separately can contain amounts of trichlorosilane, dichlorosilane and monochlorosilane, too, depending on the operating conditions which have been selected. The bottom product is recycled completely or in part into the reaction column 1 via the branch pipe 26 connected to the drain 25.

The amount or amounts of feed material flowing into the reaction column via the inlet pipes 3 and 26, as the case may be, are supplied jointly or separately into the stripping section 4, into the area between the reaction area for reaction/distillation 2 and the stripping section 4, into the reaction area for reaction/distillation 2, into the intercondenser 6 and/or into the reaction area for reaction/distillation 7, following a preliminary reaction in a pre-reactor if necessary and depending on the respective composition of the feed material.

The process according to the invention is carried out at pressures which range between 500 mbar and 50 bar, preferably between 1 bar and 10 bar, particularly preferred between 2 bar and 5 bar, in the reaction area for reaction/distillation and using catalytically active solid matter. The pressures serve to influence the temperature in the system. In those sections of the reaction areas for reaction/distillation where disproportionation takes place, temperatures range between $-10°$ C. and $180°$ C., preferably between $20°$ C. and $110°$ C. The temperature to be set depends on the range of stability of the catalytically active solid matter used.

A disadvantage of the previously described processes for separating pure silane by means of distillation concurrently with a reaction process consists in the great amount of heat which has to be carried away at the condensation temperature of silane at a given pressure, i.e. at between $-50°$ C. and $-120°$ C., for example. Condensation at the aforesaid temperatures is very disadvantageous from an economic point of view, as explained above. The amount of heat to be carried away if no intercondenser is used roughly equals the amount of heat supplied at the bottom of the reaction column so that the costs for carrying away heat will in general be considerably higher than the costs for supplying heat. This is largely avoided thanks to the intercondensation process according to the invention. For example, as much as between 60% and 97% of the heat of condensation to be carried away can already be carried away during intercondensation, depending on the pressure in the system, if a $25°$ C. warm cooling medium is used for intercondensation in order to cool down the gas flowing exiting above the intercondenser and/or above the intercondensers to $40°$ C. so that only between 3% and 40% of the heat of condensation have to be carried away at the condensation temperature of silane. Nonetheless, silane can be successfully purified upstream of the intercondenser, in a separating column arranged on top of the upper reaction area 7 and/or separately, to achieve a purity of preferably more than 90% $SiH_4$, particularly preferred more than 98% $SiH_4$, wherein the condenser which is suitable for condensing silane and is arranged at the top of the separating column is operated using a coolant temperature being below the condensation temperature of silane.

The facilities according to the invention preferably contain fittings inside the reaction columns which guarantee an intense mass transfer between the gaseous and liquid phases and at the same time permit an intense contact with the solid catalyst. Due to the combination of mass transfer and reaction, a sufficient distance from the respective chemical reaction equilibrium is guaranteed in the reaction areas for reaction/distillation by rapidly separating products which are forming so that the reaction always takes place at a high reaction velocity. Examples of such fittings are plates, packings or packing bodies for introducing heterogeneous catalysts, as they are described e.g. in the following publications: EP 670 178 A2, EP 461 855 A2, U.S. Pat. Nos. 5,026,459, 4,536,373, WO 94/08681 A1, WO 94/08682 A1, WO 94/08679 A1, EP 470 655 A1, WO 97/26971 A1, U.S.

Pat. No. 5,308,451, EP 755 706 A1, EP 781 829 A1, EP 428 265 A1, EP 448 884 A1, EP 640 385 A1, EP 631 813 A1, WO 90/02603 A1, WO 97/24174 A1, EP 665 041 A1, EP 458 472 A1, EP 476 938 A1 and in the German utility model 298 07 007.3. However, the catalytically active matter, either as such or in an agglomerated form, can also be spread onto distillation plates. In the process, the dwell time, the volume of the catalytically active matter and the separating effect brought about by distillation in the reaction area are adapted to the reaction kinetics and mass transfer kinetics, with the optimum as regards parameters strongly depending on the general conditions such as e.g. the type of catalytically active matter selected, the material system and the pressure and temperature conditions selected.

Alternatively, the catalytically active solid matter can be introduced into external reactors, which can be temperature-controlled if necessary, while the liquid phase is alternately passed from the reaction column into the reactor and from the reactor back into the reaction column for the purpose of material separation. In order to decouple different temperatures within the reaction column and in external reactors, the material flows between the reaction column and the reactors can be temperature-controlled.

Figure 5:
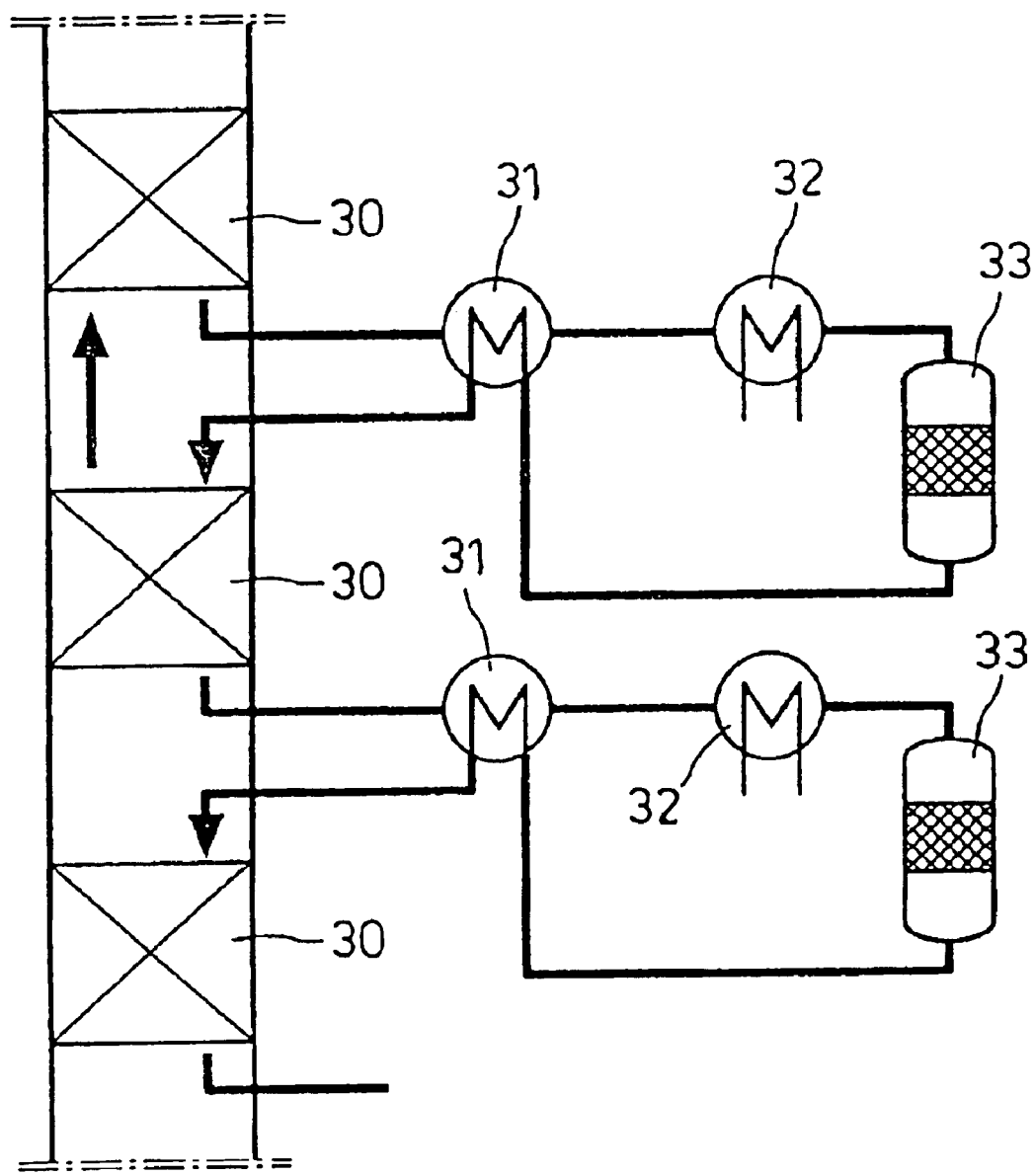
FIG. 5 shows an embodiment in which the reactors are arranged externally.

FIG. 5 shows an embodiment according to the invention in which the reaction areas for reaction/distillation 2 and 7 of FIGS. 1 to 4 have been replaced with externally arranged reactors. The liquid mixture flowing out of a distillation section 30 enters a reactor 33, via heat recovery 31 and temperature control 32 if necessary, in which reactor there is a flow from top to bottom or from bottom to top, from which it passes into the next distillation section. The "distillation section/temperature control/ reactor" sequence can be arranged one above the other as many times as desired.

According to the invention, the disproportionation process taking place in the reaction areas of the reaction columns is supplemented by separation and purification of the products containing silane and/or silicon tetrachloride which are to be removed at the top and bottom of the reaction columns, which separation/purification is brought about by distillation only. The separation by means of distillation is carried out with the aid of fittings which are usually employed for pure distillation, such as plates, packings and packing bodies. As regards the higher-boiling $SiCl_4$ component flowing out, it is advantageous, by means of separation using pure distillation taking place below the reaction area for reaction/distillation in the lower part of the reaction column to produce highly concentrated silicon tetrachloride containing more than 70% $SiCl_4$, preferably more than 95% $SiCl_4$, particularly preferred more than 99% $SiCl_4$, as a bottom product which is removed from the bottom of the reaction column.

While specific embodiments of the invention have been shown and described in detail to illustrate the application of the principles of the invention, it will be understood that the invention may be embodied otherwise without departing from such principles.

What is claimed is:

1. A continuous process for producing silane $SiH_4$ by catalytically disproportionating trichlorosilane $SiHCl_3$ to silane $SiH_4$ and silicon tetrachloride $SiCl_4$ wherein disproportionation is carried out in at least 2 reaction areas for reaction/distillation containing catalytically active solid under a pressure which ranges between 500 mbar and 50 bar, wherein the lower-boiling product mixture containing $SiH_4$ produced in a first reaction area for reaction/distillation is intercondensed at a temperature ranging between −40° C. and 50° C. and the product mixture which has not been condensed during the aforesaid step and which is enriched with highly volatile chlorosilanes, particularly with dichlorosilane $SiH_2Cl_2$, monochlorosilane $SiH_3Cl$ and silane $SiH_4$, is passed into at least one further reaction area for reaction/distillation and the mixture which has been condensed in the intercondenser, which mixture is enriched with low-volatility chlorosilanes and contains in particular high amounts of trichlorosilane $SiHCl_3$ and silicon tetrachloride $SiCl_4$, is recycled into the first reaction area.

2. A process according to claim 1 wherein the lower-boiling product mixture containing $SiH_4$ produced is partially or completely condensed in the top condenser.

3. A process according to claim 1 wherein, in total, several intercondensations at different temperature levels ranging between −40° C. and 50° C. are carried out between the reaction areas.

4. A process according to claim 1 wherein the pressure in the reaction areas is between 1 and 10 bar.

5. A process according to claim 3 wherein the intercondensations take place at temperatures ranging between −10° C. and 50° C.

6. A process according to claim 1 wherein the product mixture produced in the top condenser is subjected to a subsequent reprocessing during which it is separated at an increased pressure, compared to disproportionation.

7. A process according to claim 6 characterized in that chlorosilanes obtained during the reprocessing of the product mixture produced in the top condenser are recycled, at least in part, into the reaction area for reaction/distillation.

8. A process according to claim 1 wherein the silane content of the lower-boiling product produced in the reaction areas is increased to a concentration of >50% by weight by means of distillation in a separating section and the product mixture whose concentration has thus been increased is supplied into the top condenser.

9. A facility for producing silane $SiH_4$ in a continuous manner by disproportionating trichlorosilane $SiHCl_3$ to silane $SiH_4$ and silicon tetrachloride $SiCl_4$ in a reaction column comprising an $SiHCl_3$ inlet and a top condenser, which is either connected to the reaction column or integrated into the reaction column, for condensing product containing $SiH_4$ produced and an exhaust for condensed $SiH_4$ arranged at the top condenser and an outlet arranged at the reaction column for $SiCl_4$ produced as a bottom product, which facility is wherein that the reaction column comprises at least 2 reaction areas for reaction/distillation arranged one above the other and comprising catalyst beds which contain solid bodies formed of catalytically active solid matter and through which the disproportionation products and trichlorosilane can flow and in that at least one intercondenser is arranged between the lower one of the reaction areas for reaction/distillation and the top condenser, which intercondenser is operated at a temperature ranging between −40° C. and 50° C.

10. A facility according to claim 9 wherein that an intercondenser is arranged between 2 reaction areas for reaction/distillation which are located one above the other.

11. A facility according to claim 9 wherein that a temperature ranging between −5° C. and 40° C. is set in the intercondenser.

12. A facility according to claim 9 wherein that several intercondensers are arranged between the lowest one of the reaction areas for reaction/distillation and the top condenser.

13. A facility according to claim 12 wherein that the intercondensers are arranged above reaction areas for reaction/distillation each.

14. A facility according to claim 9 wherein that downstream of the uppermost intercondenser, in the direction of flow of the lower-boiling product mixture flowing off the intercondenser a reaction area for reaction/distillation and a rectifying section are arranged, in which the concentration of silane $SiH_4$ in the product mixture is increased by means of distillation.

15. A facility according to claim 9 wherein that downstream of the uppermost intercondenser, in the direction of flow of the lower-boiling product mixture flowing off the intercondenser, a separating column is arranged for separating product components containing $SiH_4$ from higher-boiling chlorosilane components.

16. A facility according to claim 15 wherein the separating column is arranged downstream of a rectifying section in which the concentration of silane $SiH_4$ in the product mixture is increased by means of distillation, the recetifuying section being downstream of the uppermost intercondenser, in the direction of flow of the lower-boiling product mixture flowing off the intercondenser.

17. A facility according to claim 16 wherein that a condenser is arranged between the rectifying section and the separating column.

18. A facility according to claim 15 wherein that the separating column operates at an increased pressure, compared to the intercondenser, and the product passed into the separating column is compressed.

19. A facility according to claim 15 wherein that a branch pipe is connected to the bottom drain of the separating column, which branch pipe opens into a reaction area for reaction/distillation of the reaction column.

* * * * *